US012631850B2

(12) United States Patent
Chen et al.

(10) Patent No.: US 12,631,850 B2
(45) Date of Patent: May 19, 2026

(54) LENS HOUSING, LENS MODULE AND LIGHT SOURCE SYSTEM

(71) Applicant: YLX Incorporated, Shenzhen (CN)

(72) Inventors: Hui Chen, Shenzhen (CN); Quan Zhang, Shenzhen (CN); Yeju Liang, Shenzhen (CN)

(73) Assignee: YLX Incorporated, Shenzhen (CN)

( * ) Notice: Subject to any disclaimer, the term of this patent is extended or adjusted under 35 U.S.C. 154(b) by 733 days.

(21) Appl. No.: 17/745,267

(22) Filed: May 16, 2022

(65) Prior Publication Data

US 2022/0373761 A1      Nov. 24, 2022

(30) Foreign Application Priority Data

May 19, 2021    (CN) .......................... 202121084982.9

(51) Int. Cl.
*G02B 7/02*          (2021.01)
*G03B 17/12*         (2021.01)
(52) U.S. Cl.
CPC ............. *G02B 7/022* (2013.01); *G02B 7/021* (2013.01); *G03B 17/12* (2013.01)
(58) Field of Classification Search
CPC .......... G02B 7/10; G02B 7/021; G02B 7/022; G02B 7/023; G02B 7/026; G02B 19/0014; G02B 7/00; G02B 7/003; G02B 7/004; G02B 7/005; G02B 7/02; G02B 7/025; G03B 17/12
See application file for complete search history.

(56) References Cited

U.S. PATENT DOCUMENTS

| | | | | |
|---|---|---|---|---|
| 5,774,282 | A | * | 6/1998 | Kohmoto ............... G02B 7/026 |
| | | | | 359/695 |
| 2014/0254033 | A1 | | 9/2014 | Leitzsch et al. |
| 2016/0291281 | A1 | | 10/2016 | Lamontagne et al. |
| 2017/0227833 | A1 | | 8/2017 | Yang et al. |
| 2020/0319425 | A1 | | 10/2020 | Huang |
| 2022/0377214 | A1 | * | 11/2022 | Ohara .................... G03B 43/00 |

FOREIGN PATENT DOCUMENTS

| | | | | |
|---|---|---|---|---|
| CN | 110262055 | A | * | 9/2019 ......... G02B 27/4205 |
| KR | 100829980 | B1 | * | 5/2008 |

OTHER PUBLICATIONS

Extended European Search Report issued in corresponding EP Application 22173455.1, issued Oct. 18, 2022, 7 pages.
European Office Action(22173455.1); Date of Mailing: Dec. 9, 2024(5 pages).

* cited by examiner

*Primary Examiner* — Alexander P Gross
(74) *Attorney, Agent, or Firm* — Burris Law, PLLC

(57)                    ABSTRACT
A lens housing, a lens module and a light source system are disclosed. The lens housing includes a lens holder, a leans barrel, and a fixed pressing plate. The lens holder includes an accommodating cavity having an internal thread. The lens barrel is provided with a receiving cavity along an axial direction and includes an adjustment structure along a circumferential direction. An outer circumferential wall of the lens barrel is provided with an external thread matching the internal thread. The lens barrel is embedded in the accommodating cavity of the lens holder and is in threaded connection with the lens holder. The fixed pressing plate is fixed to one side of the lens barrel away from the lens holder and is capable of moving axially relative to the lens holder.

10 Claims, 13 Drawing Sheets

<u>100</u>

200

LENS HOUSING, LENS MODULE AND LIGHT SOURCE SYSTEM

CROSS-REFERENCE TO RELATED APPLICATIONS

This application claims priority to and the benefit of Chinese Application No. 202121084982.9, filed on May 19, 2021, the content of which is incorporated herein by reference in its entirety.

FIELD

The present disclosure relates to the field of lighting technologies, and in particular, to a lens housing, a lens module and a light source system.

BACKGROUND

The statements in this section merely provide background information related to the present disclosure and may not constitute prior art.

A laser light source is an electric light source which uses excited particles to emit light under the action of excited radiation, and is a coherent light source. The laser light source has the advantages of high brightness, bright in color, low energy consumption, a long service life and a small volume, and thus is widely used.

At present, due to overall deviations accumulated by errors of various optical components in a laser light source system during the manufacturing and assembly and by deviations in angles of light paths, a large deviation in size of a light spot emitted by the laser light source system may easily occur, which may further affect illumination brightness and performance of the light spot.

SUMMARY

This section provides a general summary of the disclosure and is not a comprehensive disclosure of its full scope or all of its features.

An objective of the present disclosure includes, for example, providing a lens housing, a lens module and a light source system to alleviate the above problems.

Embodiments of the present disclosure may be implemented as follows.

In a first aspect, a lens housing is provided. The lens housing includes a lens holder including an accommodating cavity having an internal thread; a lens barrel provided with a receiving cavity along an axial direction and including an adjustment structure along a circumferential direction, an outer circumferential wall of the lens barrel being provided with an external thread matching the internal thread, and the lens barrel being embedded in the accommodating cavity of the lens holder and in threaded connection with the lens holder; and a fixed pressing plate fixed to one side of the lens barrel away from the lens holder and capable of moving axially relative to the lens holder.

In a second aspect, a lens module is provided, including an optical component and a lens housing. The lens housing includes a lens holder including an accommodating cavity having an internal thread; a lens barrel provided with a receiving cavity along an axial direction and including an adjustment structure along a circumferential direction, an outer circumferential wall of the lens barrel being provided with an external thread matching the internal thread, and the lens barrel being embedded in the accommodating cavity of the lens holder and in threaded connection with the lens holder; and a fixed pressing plate fixed to one side of the lens barrel away from the lens holder and capable of moving axially relative to the lens holder. The optical component is embedded into the receiving cavity of the lens barrel, and the fixed pressing plate is pressed against the optical component to lock and fix the optical component in the receiving cavity of the lens barrel.

In a third aspect, a light source system is provided, the light source system including a light source and a lens module. The light source is located in a front-end light path of the lens module. The lens module includes an optical component and a lens housing. The lens housing includes a lens holder including an accommodating cavity having an internal thread; a lens barrel provided with a receiving cavity along an axial direction and including an adjustment structure along a circumferential direction, an outer circumferential wall of the lens barrel being provided with an external thread matching the internal thread, and the lens barrel being embedded in the accommodating cavity of the lens holder and in threaded connection with the lens holder; and a fixed pressing plate fixed to one side of the lens barrel away from the lens holder and capable of moving axially relative to the lens holder. The optical component is embedded into the receiving cavity of the lens barrel, and the fixed pressing plate is pressed against the optical component to lock and fix the optical component in the receiving cavity of the lens barrel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

In order to better illustrate the technical solutions of embodiments of the present disclosure, the accompanying drawings to be used in the embodiments are briefly described below. It is to be understood that, only some embodiments of the present disclosure are shown in the following accompanying drawings, which should not be regarded as limitations on the scope. Those of ordinary skill in the art may also obtain other related drawings according to the provided drawings without creative efforts.

REFERENCE SIGNS

Figure 1:
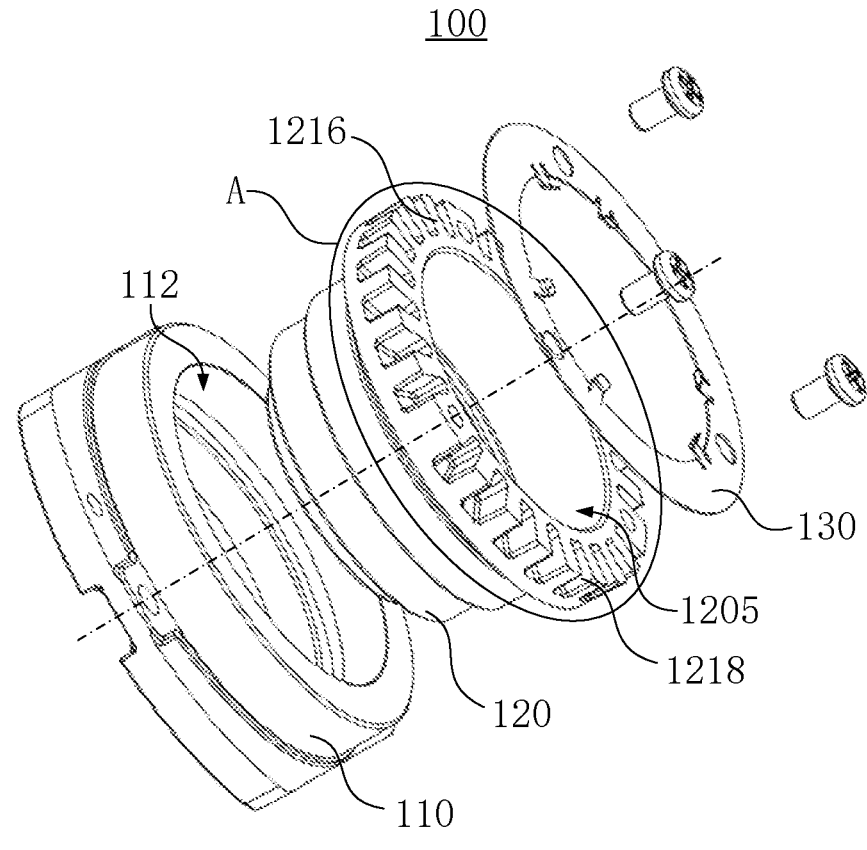
FIG. 1 is a schematic exploded view of a lens housing according to an embodiment of the present disclosure.

100: lens housing; 110: lens holder; 112: accommodating cavity; 1121: first inner sidewall; 1123: second inner sidewall; 120: lens barrel; 1205: receiving cavity; 1210: first outer sidewall; 1212: second outer sidewall; 1214: third outer sidewall; 1216: adjustment structure; 1218: teeth-like groove; 122: glue dispensing slot; 130: fixed pressing plate; 132: pressing plate body; 134: buckling member; 1341: connecting section; 1343: bending section; 141: first inner wall; 151: first plane; 143: second inner wall; 153: second plane; 145: third inner wall; 155: third plane; 147: fourth inner wall; 161: first inner step; 162: first inner corner; 163: second inner corner; 164: second inner corner; 165: third inner step; 166: third inner corner; 200: lens module; 210: lens; 211: first lens; 2110: first cylindrical section; 2113: second cylindrical section; 2115: first clamping portion; 213: second lens; 215: third lens; 220: spacer; 222: first spacer; 2221: first end face; 2223: second end face; 2225: first outer wall; 2227: first connection plane; 2229: second outer wall; 2230: first outer step; 2231: first outer corner; 2233: second outer step; 224: second spacer; 2241: third end face; 2243: fourth end face; 300: light source system; 310: light source; 320: fixing assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to make the objectives, technical solutions and advantages of embodiments of the present disclosure clearer, the technical solutions in embodiments of the present disclosure will be described clearly and completely below with reference to the accompanying drawings in the embodiments of the present disclosure. It is appreciated that, the described embodiments are merely some of rather than all of the embodiments of the present disclosure. Generally, the components according to the embodiments of the present disclosure described and shown here in the accompanying drawings may be laid out and designed in a variety of configurations.

It is to be noted that, features in embodiments of the present disclosure may be combined with each other, unless conflict occurs.

At present, due to overall deviations caused by deviations more or less produced by various optical components in a laser light source system during the manufacturing and assembly and deviations in angles of light paths in the laser light source system, a large deviation in positions between optical devices or size of an light spot emitted in the laser light source system may easily occur A serious deviation may even affect illumination and the light spot. Especially in a laser source system that requires light splitting and combination of two or more channels of light, there is a need to correct positions between optical lenses.

Based on the above problems, referring to FIG. 1, an embodiment of the present disclosure provides a lens housing 100.

The lens housing 100 may include a lens holder 110, a lens barrel 120 and a fixed pressing plate 130.

The lens holder 110 includes an accommodating cavity 112. The lens barrel 120 is embedded in the accommodating cavity 112 of the lens holder 110. The fixed pressing plate 130 is fixed to one side of the lens barrel 120 away from the lens holder 110. The fixed pressing plate 130 is configured to lock and fix an optical component in a receiving cavity 1205 of the lens barrel 120. The optical component, the lens barrel 120 and the fixed pressing plate 130 may be axially adjusted relative to the lens holder 110 as a whole.

The lens barrel 120 is in threaded connection with the lens holder 110. The lens barrel 120 is provided with an adjustment structure 1216 along a circumferential direction. The optical component is locked and fixed in the lens barrel 120 through the fixed pressing plate 130. As a result, the lens barrel 120, the fixed pressing plate 130 and the optical component fixed in the receiving cavity 1205 of the lens barrel 120 can be axially adjusted relative to the lens holder 110 as a whole. This configuration helps to improve accuracy of axial adjustment and reduce an adjustment deviation. The lens housing 100 according to the present disclosure is suitable for axial distance adjustment of compact lens modules with small volume.

Figure 2:
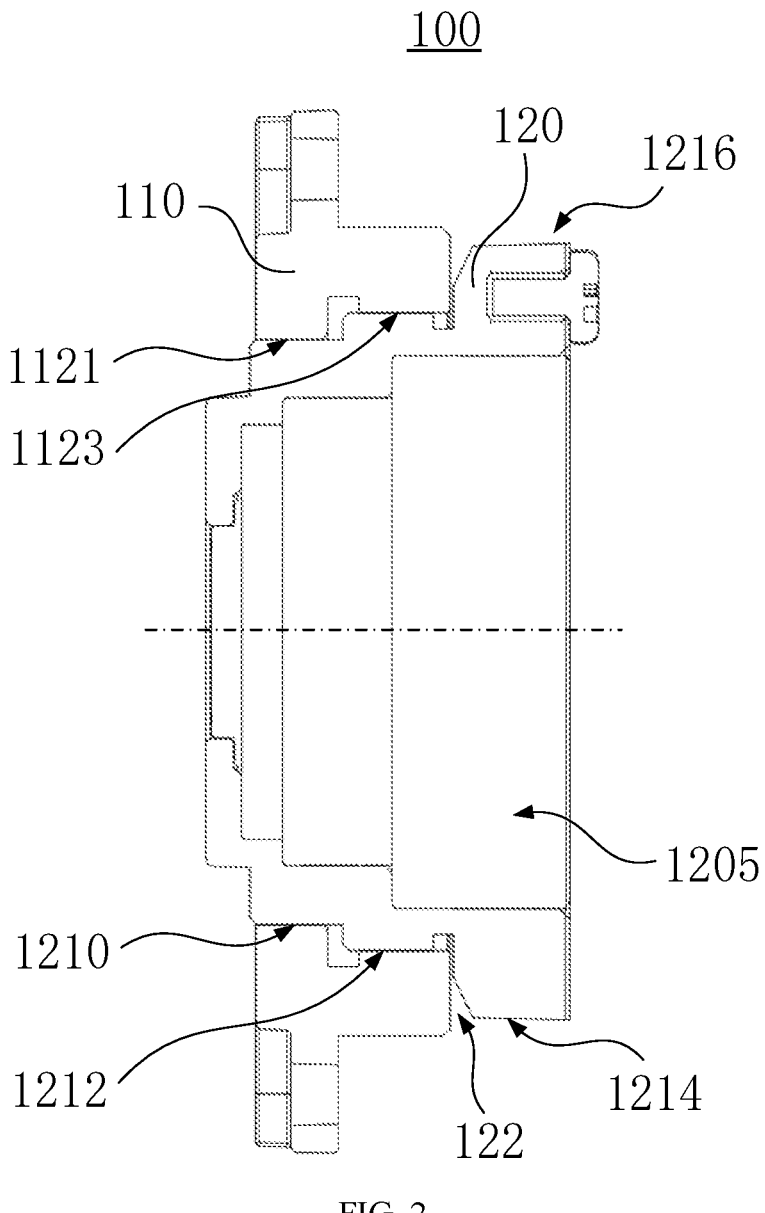
FIG. 2 is a sectional view of the lens housing according to an embodiment of the present disclosure.

Referring to both FIG. 1 and FIG. 2, the lens holder 110 includes an accommodating cavity 112. The accommodating cavity 112 has a through-hole structure. An inner peripheral wall of the accommodating cavity 112 is provided with an internal thread.

Further referring to FIG. 2, the accommodating cavity 112 of the lens holder 110 includes a first inner sidewall 1121 and a second inner sidewall 1123 arranged along the axial direction. An inner diameter of the first inner sidewall 1121 is less than the second inner sidewall 1123, so that the inner sidewall of the accommodating cavity 112 of the lens holder 110 has a stepped structure, and the internal thread is arranged on the second inner sidewall 1123. A tool withdrawal groove is further provided between the first inner sidewall 1121 and the second inner sidewall 1123, which facilitates the machining of the internal thread.

In some embodiments, the lens barrel 120 has a hollow columnar structure, and includes a receiving cavity 1205 arranged along the axial direction. A section of an outer circumferential wall of the lens barrel 120 connected to the second inner sidewall 1123 of the lens holder 110 is provided with an external thread. The external thread matches an internal thread on an inner wall of the lens holder 110, so that the lens barrel 120 is embedded in the accommodating cavity 112 of the lens holder 110 and in threaded connection with the lens holder 110. Circumferential rotation may be changed into axial movement by screwing.

The lens barrel 120 is provided with an adjustment structure 1216 along a circumferential direction. The adjustment structure 1216 is arranged on at least part of the outer circumferential wall of the lens barrel 120. That is, the adjustment structure 1216 may be arranged around a whole circle or a part of the circumferential direction of the lens barrel 120. With the arrangement of the adjustment structure 1216 along the circumferential direction, an axial movement distance of the lens barrel 120 may be controlled according to the adjustment structure 1216 when the lens barrel 120 is required to be axially adjusted relative to the lens holder 110.

As shown in FIG. 1, the adjustment structure 1216 is arranged on one side of the lens barrel 120 away from the lens holder 110. The adjustment structure 1216 may include a plurality of teeth-like grooves 1218 spaced along the circumferential direction.

In some embodiments, when the lens barrel 120 rotates a teeth-like groove relative to the lens holder 110, the lens barrel 120 moves by a unit distance axially relative to the lens holder 110. When the lens barrel 120 rotates N teeth-like grooves relative to the lens holder 110, the lens barrel 120 moves by N unit distances axially relative to the lens holder 110. N may be equal to 1, 2, 3, 4, 5. The unit distance is a minimum distance of axial movement. The unit distance may be determined according to a pitch of the external thread arranged on the lens barrel 120.

It is to be noted that the unit distance may be determined by a ratio of the pitch P of the external thread on the lens barrel 120 to the number of teeth-like grooves. That is, an axial movement distance of the lens barrel 120 relative to the lens holder 110 may be determined from each rotation of an axial distance of a teeth-like groove. Thus, axial displacement adjustment of the lens barrel 120 may be accurately controlled by using N times unit distance, which is beneficial to improve the accuracy of the axial adjustment distance and suitable for compact lens modules with small volume.

Figure 3:
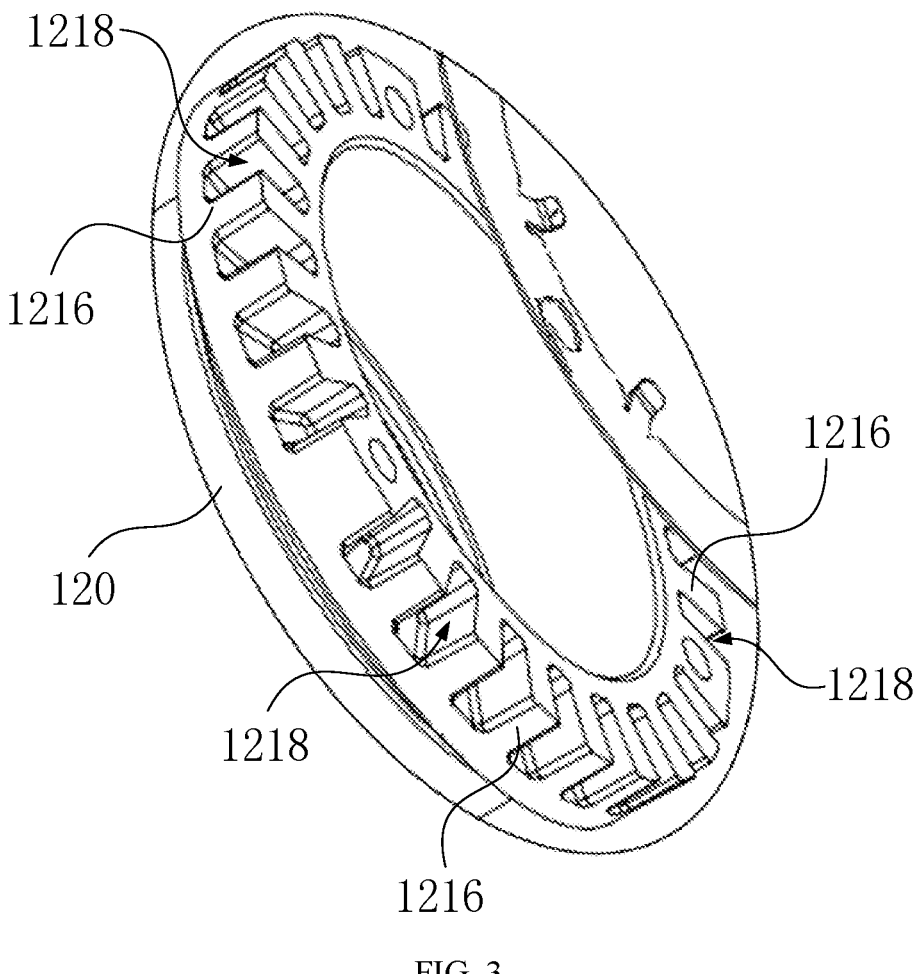
FIG. 3 is a schematic enlarged view of portion A in FIG. 1.

Referring to FIG. 3, in one embodiment of the present disclosure, a plurality of stages of adjustment structures 1216 may be provided, wherein each stage of the adjustment structure 1216 includes a plurality of teeth-like grooves 1218 equally spaced from one another. When each stage of adjustment structure 1216 includes M teeth-like grooves 1218, the M teeth-like grooves 1218 are arranged around part of the outer circumferential wall of the lens barrel 120. The plurality of stages of adjustment structures 1216 is equally spaced from one another along the outer circumferential wall of the lens barrel 120, and the plurality of stages of adjustment structures 1216 may just define a whole circle.

For example, three stages of adjustment structures 1216 may be provided, and M teeth-like grooves 1218 are equally spaced from one another in each stage of adjustment structure 1216. A distance between any two adjacent stages of adjustment structures 1216 is equal and is referred to as a first distance. A distance between any two adjacent teeth-like grooves 1218 in each stage of adjustment structure 1216 is equal and is referred to as a second distance.

In some embodiments, the first distance and the second distance may not be equal. When the first distance and the second distance are not equal, it is equivalent to dividing the outer circumferential wall of the lens barrel 120 into 3 equal sections along the circumferential direction, each section is provided with an adjustment structure 1216, each adjustment structure 1216 includes M teeth-like grooves 1218, and the M teeth-like grooves 1218 are equally spaced from one another.

In some other embodiments, the first distance and the second distance may be equal. When the first distance and the second distance are equal, it is equivalent that a plurality of teeth-like grooves 1218 is equally spaced around the circumferential direction of the lens barrel 120 and just defines a whole circle. The number of the teeth-like grooves 1218 may be reasonably designed according to the pitch of the external thread of the lens barrel 120, so as to achieve convenient and accurate adjustment.

In some other embodiments, the adjustment structure 1216 may also include teeth-like protrusions or include both teeth-like grooves and teeth-like protrusions. The teeth-like protrusions are convex on the outer circumferential wall of the lens barrel 120, and the teeth-like grooves are concave on the outer circumferential wall of the lens barrel 120. It is understood that the specific number, the specific arrangement and the specific structure of the adjustment structure 1216 are not limited in the present disclosure and may be determined according to an actual requirement, provided that the adjustment structure can be easily adjusted and the adjustment accuracy can be improved.

Further, in order to improve coaxial extent of axial adjustment of the lens barrel 120 relative to the lens holder 110 after the threaded connection between the lens barrel 120 and the lens holder 110 to reduce a radial deviation, a radial limit may be realized by designing a relationship between an outer diameter size of the lens barrel 120 and an inner diameter size of the lens holder 110.

In some embodiments, as shown in FIG. 2, a segmented matching structure may be designed between the lens barrel 120 and the lens holder 110. Matching the inner sidewall of the lens holder 110, the outer circumferential wall of the lens barrel 120 may include a first outer sidewall 1210, a second outer sidewall 1212 and a third outer sidewall 1214 sequentially arranged along the axial direction.

In the lens barrel 120, an outer diameter of the first outer sidewall 1210 is less than the second outer sidewall 1212, the outer diameter of the second outer sidewall 1212 is less than the third outer sidewall 1214, and the first outer sidewall 1210, the second outer sidewall 1212 and the third outer sidewall 1214 form a stepped structure. The external thread is arranged on the second outer sidewall 1212, and the adjustment structure 1216 is arranged on the third outer sidewall 1214.

During mounting, the first inner sidewall 1121 of the lens holder 110 matches the first outer sidewall 1210 of the lens barrel 120, and the second inner sidewall 1123 of the lens holder 110 is in threaded connection with the second outer sidewall 1212 of the lens barrel 120.

Through the size design, the inner diameter size of the first inner sidewall 1121 of the lens holder 110 matches the outer diameter size of the first outer sidewall 1210 of the lens barrel 120, and meets requirements of coaxial extent tolerance, so as to ensure the coaxial extent between the lens holder 110 and the lens barrel 120, which is conducive to reducing the radial deviation between the lens barrel 120 and the lens holder 110.

Since the second outer sidewall 1212 of the lens barrel 120 is in threaded connection with the second inner sidewall 1123 of the lens holder 110, rotation may be changed into axial movement. Therefore, the fixed pressing plate 130 and the lens barrel 120, after being fixedly connected, may move along the axial direction relative to the lens holder 110 as a whole, which facilitates axial distance adjustment. The arrangement of the adjustment structure 1216 on the outer circumferential wall of the lens barrel 120 facilitates accurate adjustment on the axial movement distance of the lens barrel 120 relative to the lens holder 110.

After the adjustment of the axial distance between the lens barrel 120 and the lens holder 110, the lens barrel 120 and the lens holder 110 may be bonded and fixed by adhesive. For example, the lens barrel 120 and the lens holder 110 may be fixed by providing a glue dispensing slot therebetween and applying glue to the glue dispensing slot.

As shown in FIG. 2, in order to facilitate the arrangement of glue dispensing slot 122 between the third outer sidewall 1214 of the lens barrel 120 and an end face of the lens holder 110 close to the second inner sidewall 1123, in some embodiments, the adjustment structure 1216 may be arranged at one end of the third outer sidewall 1214 away from the second outer sidewall 1212, and one end of the third outer sidewall 1214 close to the second outer sidewall 1212 matches the end face of the lens holder 110.

Still referring to FIG. 2, a chamfer is provided on an outer edge of one end of the third outer sidewall 1214 of the lens barrel 120 close to the second outer sidewall 1212. The stepped structure formed between the third outer sidewall 1214 and the second outer sidewall 1212 of the lens barrel 120 includes a step surface. After the lens barrel 120 is mounted in the accommodating cavity 112 of the lens holder 110, the step surface matches the end face of the lens holder 110 close to the second inner sidewall 1123. Moreover, the end face and the step surface may form a glue dispensing slot 122 around the position of the chamfer.

After the adjustment of the lens barrel 120 relative to the lens holder 110 is completed, the glue may be applied to the glue dispensing slot 122, so that the lens holder 110 and the lens barrel 120 after the position adjustment are bonded and fixed.

It is understood that, in other optional embodiments, the glue dispensing slot 122 may also be a recess provided between the end face of the lens holder 110 and the step surface. In addition to the above structures, the following two structures may also be included.

In the first structure, no chamfer is provided at a corner of the step surface and the third outer sidewall 1214 of the lens barrel 120, only a recess is provided on the end face of the lens holder 110, and the recess corresponds to a position of the third outer sidewall 1214. The recess is the glue dispensing slot between the lens holder 110 and the lens barrel 120.

In the second structure, recesses may be provided at suitable positions on the end face of the lens holder 110 and the step surface of the lens barrel 120, and the recess on the end face and the recess on the step surface correspond to each other and form the glue dispensing slot.

In addition to the chamfer, other shapes such as a rounded corner, an arc or a recess may also be provided between the third outer sidewall 1214 and the step surface of the lens barrel 120. The arrangement position and the forming manner of the glue dispensing slot 122 are not limited in the present disclosure, provided that the glue dispensing slot 122 is formed between outer edges of the end face of the lens holder 110 and the step surface of the lens barrel 120, which is determined according to actual requirement.

Figure 4:
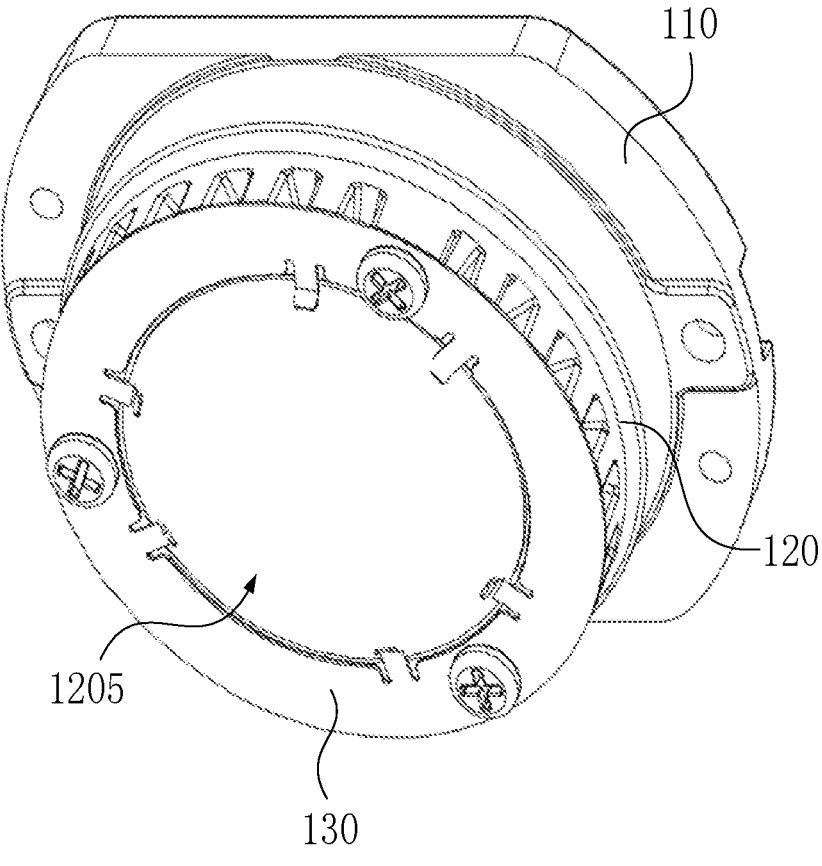
FIG. 4 is a schematic structural diagram of a lens housing according to an embodiment of the present disclosure.

Referring to FIG. 4, the fixed pressing plate 130 has a thin annular structure. The fixed pressing plate 130 is fixedly connected to one side of the lens barrel 120 away from the lens holder 110. The fixed pressing plate 130 is fixed to the lens barrel 120 through a locking member, so that the fixed pressing plate 130 compressively fixes the optical component in the receiving cavity 1205 of the lens barrel 120, and so that the lens barrel 120, the optical component and the fixed pressing plate 130 may be axially adjusted relative to the lens holder 110 as a whole.

Figure 5:
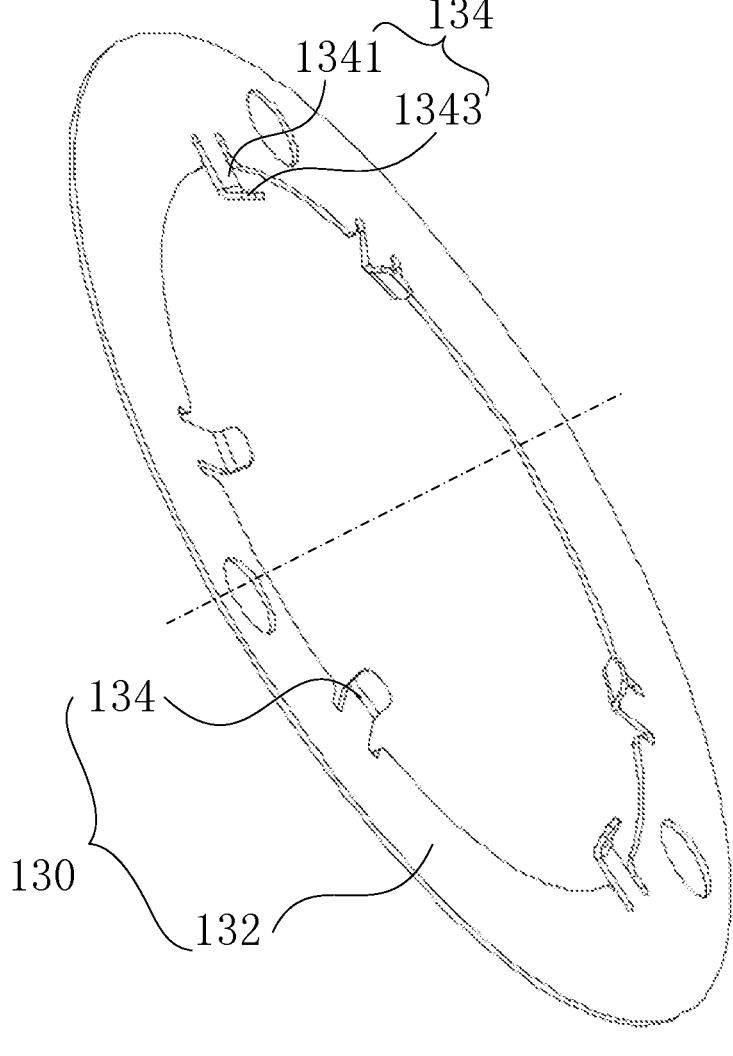
FIG. 5 is a schematic structural diagram of a fixed pressing plate in FIG. 1.

Referring to both FIG. 4 and FIG. 5, the fixed pressing plate 130 may include a pressing plate body 132 and a buckling member 134. The pressing plate body 132 has an annular structure. An inner edge of the pressing plate body 132 is convexly provided with the buckling member 134 toward a central position.

During mounting, the pressing plate body 132 is fixed to the lens barrel 120. The buckling member 134 is configured to compressively fix the optical component in the receiving cavity 1205 of the lens barrel 120. Since a device in the optical component close to the fixed pressing plate 130 is a convex lens and the convex lens protrudes toward one side of the fixed pressing plate 130, the buckling member 134 abuts against a convex part of the convex lens, which is conducive to fixing the optical component more firmly in the receiving cavity 1205 of the lens barrel 120.

In some embodiments, a plurality of buckling members 134 may be provided. The plurality of buckling members 134 may be spaced from one another along an inner edge of the pressing plate body 132, and each buckling member 134 may be pressed against the optical component, so as to lock and fix the optical component and the lens barrel 120.

Each buckling member 134 may include a connecting section 1341 and a bending section 1343. The connecting section 1341 is fixedly connected to the pressing plate body 132, and the bending section 1343 is a free end. The connecting section 1341 and the pressing plate body 132 are connected to each other and located in a same plane. The bending section 1343 is bent toward one side of the pressing plate body 132 close to the lens barrel 120, and an obtuse angle is formed between the bending section 1343 and the connecting section 1341. After the pressing plate body 132 is fixed to the lens barrel 120, the bending section 1343 of the buckling member 134 may be pressed against the optical component.

In the lens housing 100 according to the present disclosure, the design of the segmented matching connection between the lens barrel 120 and the lens holder 110 may not only ensure the coaxial extent of dimensional tolerance between the first outer sidewall 1210 of the lens barrel 120 and the first inner sidewall 1121 of the lens holder 110, but also improve the accuracy of axial distance adjustment between the lens barrel 120 and the lens holder 110. The buckling member 134 is convexly arranged on the inner side of the fixed pressing plate 130, so the optical component may be compressively fixed in the receiving cavity 1205 of the lens barrel 120 through the buckling member 134, which is beneficial to improve the stability after mounting. Moreover, after mounting, the lens barrel 120, the optical component and the fixed pressing plate 130 may be axially adjusted relative to the lens holder 110 as a whole, which is beneficial to achieve the highest brightness and an optimal light combination effect of light spots of a light source. After the lens barrel 120 is adjusted relative to a position of the lens holder 110, they may be fixed by adhesive and their relative positions are fixed and reliable.

Figure 6:
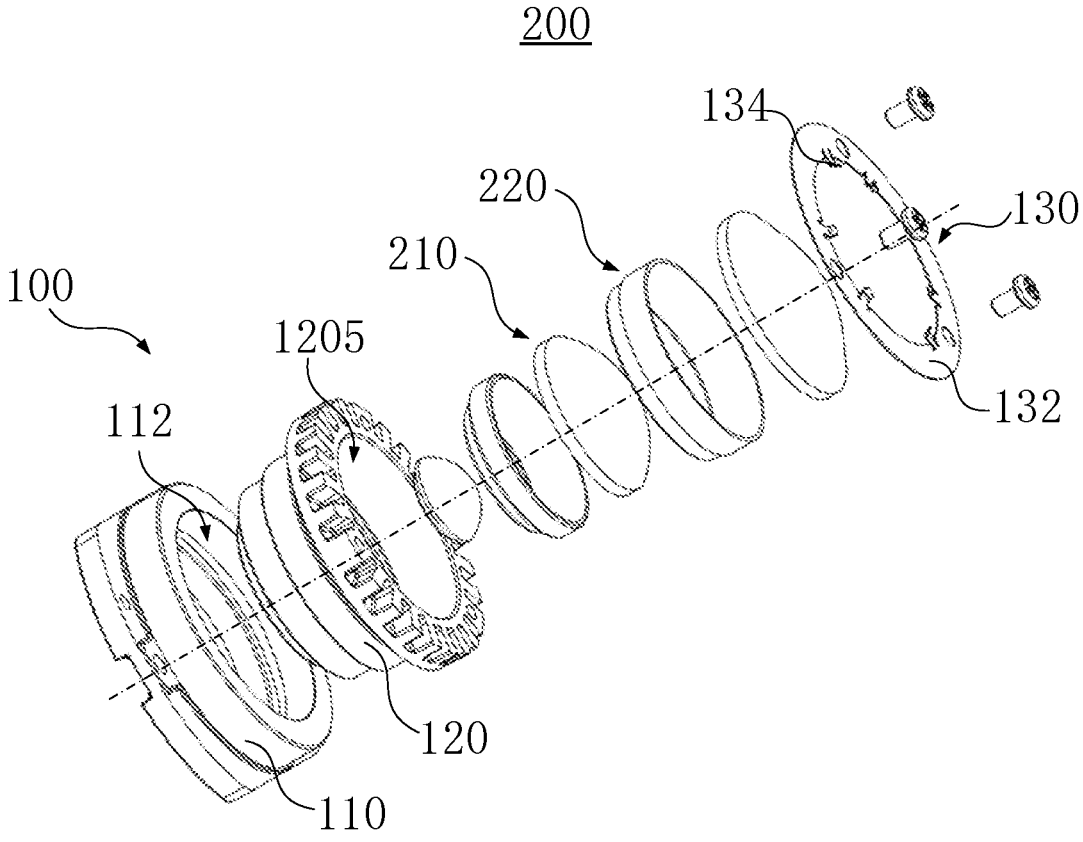
FIG. 6 is a schematic exploded view of a lens module according to an embodiment of the present disclosure.

Referring to FIG. 6, an embodiment of the present disclosure further provides a lens module 200. The lens module 200 may include an optical component and the lens housing 100 described as above. During mounting, the optical component is embedded in the receiving cavity 1205 of the lens barrel 120, and the fixed pressing plate 130 is fixed to the lens barrel 120 and is pressed against the optical component, so that the optical component is firmly locked in the receiving cavity 1205 of the lens barrel 120.

The optical component may include a lens 210 and a spacer 220. A plurality of lenses 210 may be provided, and the spacer 220 is arranged between any two adjacent lenses 210, so as to space the lenses 210 apart to ensure a distance between the two adjacent lenses 210.

Figure 7:
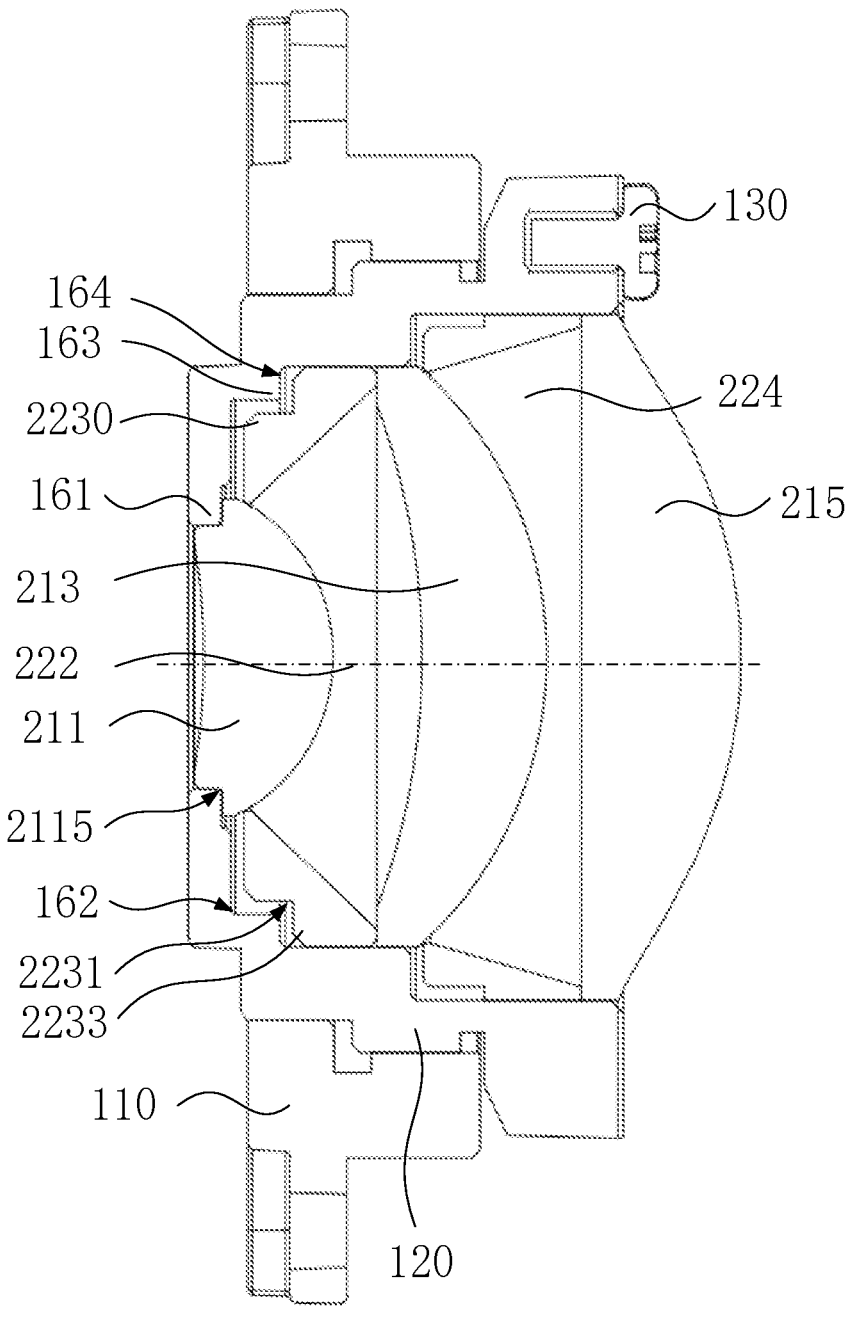
FIG. 7 is a sectional view of a lens module according to an embodiment of the present disclosure.

Referring to both FIG. 6 and FIG. 7, during mounting, the lens barrel 120 is embedded in the accommodating cavity 112 of the lens holder 110 and in threaded connection with the lens holder 110. Then the lens 210 and the spacer 220 are sequentially spaced and embedded in the receiving cavity 1205 of the lens barrel 120. Finally, the pressing plate body 132 is fixed to the lens barrel 120, and the buckling member 134 convexly arranged on the inner side of the pressing plate body 132 is pressed against the lens 210 and the spacer 220, so that the optical component and the lens barrel 120 are locked and fixed. After the assembly is completed, the lens barrel 120, the optical component and the fixed pressing plate 130 may be taken as a whole for axial position adjustment relative to the lens holder 110 through threaded connection. It is to be noted that, the lens 210 and the spacer 220 may also be first embedded in the lens barrel 120 and the pressing plate body 132 is fixed to the lens barrel 120, so that the optical component and the lens barrel 120 are locked and fixed, and then the lens barrel, the optical component and the fixed pressing plate locked and fixed are mounted on the lens holder 110 as a whole.

A stepped structure matching the plurality of lenses 210 and the spacers 220 are arranged axially on the inner sidewall of the lens barrel 120, and the shape and the number of steps match the lenses 210 and the spacers 220.

Figure 8:
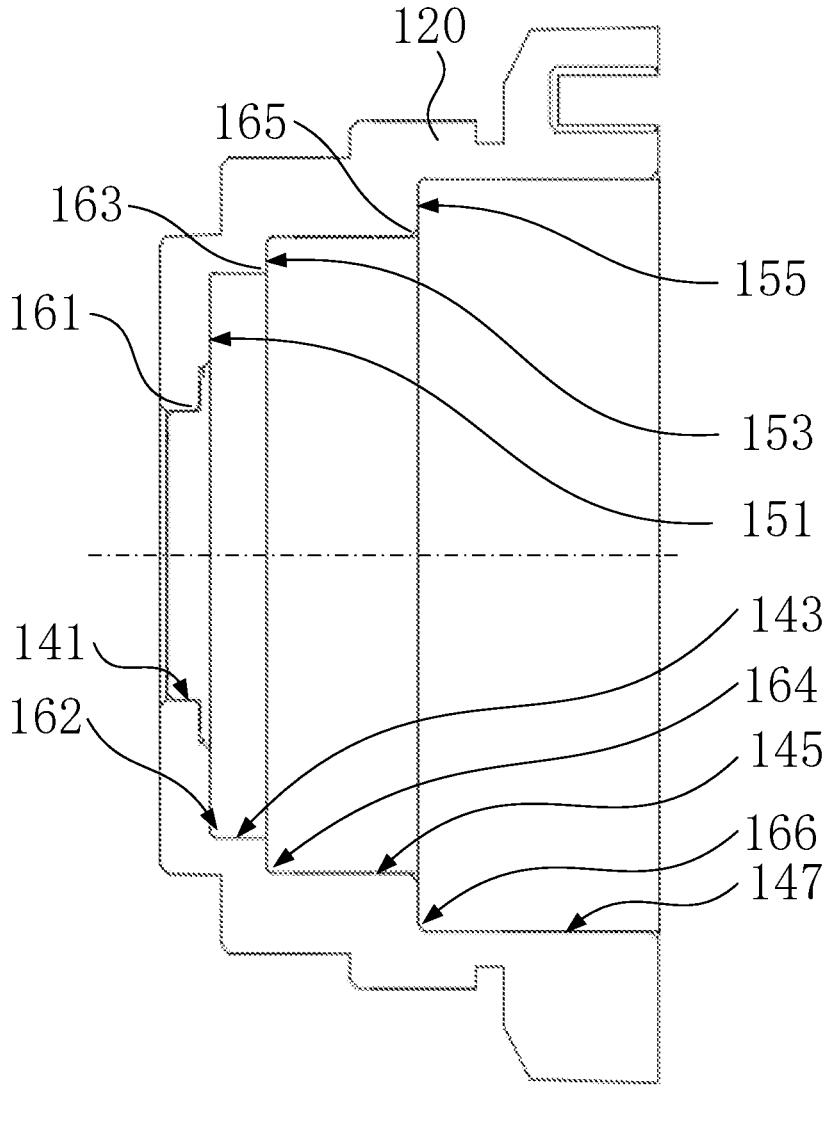
FIG. 8 is a sectional view of a lens barrel in a lens module according to an embodiment of the present disclosure.

In some embodiments of the present disclosure, referring to FIG. 8, the inner sidewall of the lens barrel 120 may include a first inner wall 141, a first plane 151, a second inner wall 143, a second plane 153, a third inner wall 145, a third plane 155 and a fourth inner wall 147 sequentially arranged along the axial direction.

The first inner wall 141 and the first plane 151 may be perpendicular to form a first inner step 161, and the first plane 151 and the second inner wall 143 may be perpendicular to form a first inner corner 162. The second inner wall 143 and the second plane 153 may be perpendicular to form a second inner step 163, and the second plane 153 and the third inner wall 145 may be perpendicular to form a second inner corner 164. The third inner wall 145 and the third plane 155 may be perpendicular to form a third inner step 165, and the third plane 155 and the fourth inner wall 147 may be perpendicular to form a third inner corner 166. Inner diameters of the first inner wall 141, the second inner wall 143, the third inner wall 145 and the fourth inner wall 147 sequentially increase.

As shown in FIG. 7, the lens 210 may include a first lens 211, a second lens 213 and a third lens 215. An outer diameter size of the first lens 211 is less than the second lens 213. The outer diameter size of the second lens 213 is less than the third lens 215. The first lens 211, the second lens 213 and the third lens 215 may all be convex lenses.

Figure 9:
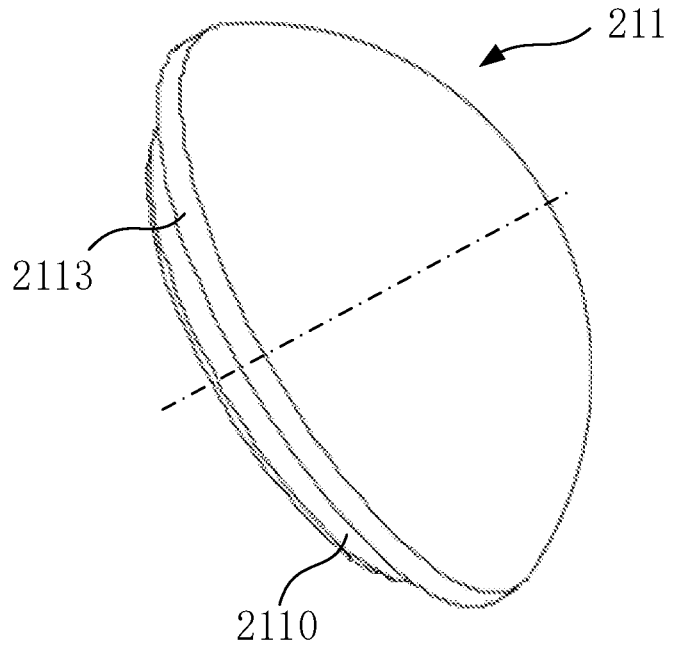
FIG. 9 is a schematic structural diagram of a first lens in a lens module from a first perspective according to an embodiment of the present disclosure.
Figure 10:
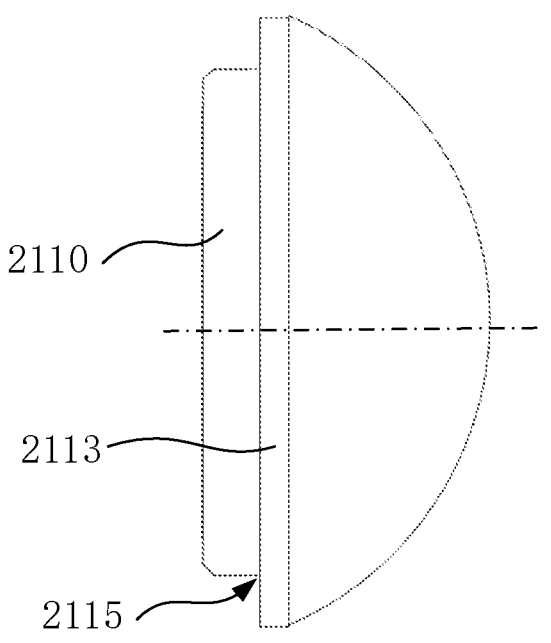
FIG. 10 is a schematic structural diagram of a first lens in a lens module from a second perspective according to an embodiment of the present disclosure.

Referring to both FIG. 9 and FIG. 10, the first lens 211 may sequentially include a first cylindrical section 2110, a second cylindrical section 2113 and a convex lens part along the axial direction. An outer diameter of the first cylindrical section 2110 is less than the second cylindrical section 2113. A first clamping portion 2115 matching the first inner step 161 of the inner sidewall of the lens barrel 120 may be formed at a junction between the first cylindrical section 2110 and the second cylindrical section 2113. During mounting, the first clamping portion 2115 is clamped to the first inner step 161. As shown in FIG. 7, outer circumferential walls of the second lens 213 and the third lens 215 are cylindrical structures, and the convex lens parts of the first lens 211, the second lens 213 and the third lens 215 are oriented in the same direction.

As shown in FIG. 7, the spacer 220 may include a first spacer 222 and a second spacer 224. The first spacer 222 is located between the first lens 211 and the second lens 213, and the second spacer 224 is located between the second lens 213 and the third lens 215.

Figure 11:
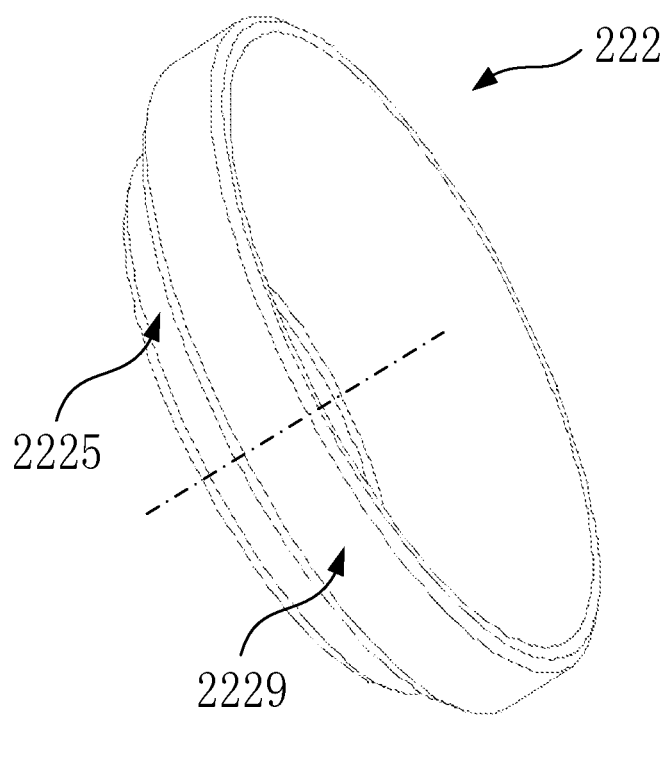
FIG. 11 is a schematic structural diagram of a first spacer in a lens module according to an embodiment of the present disclosure.
Figure 12:
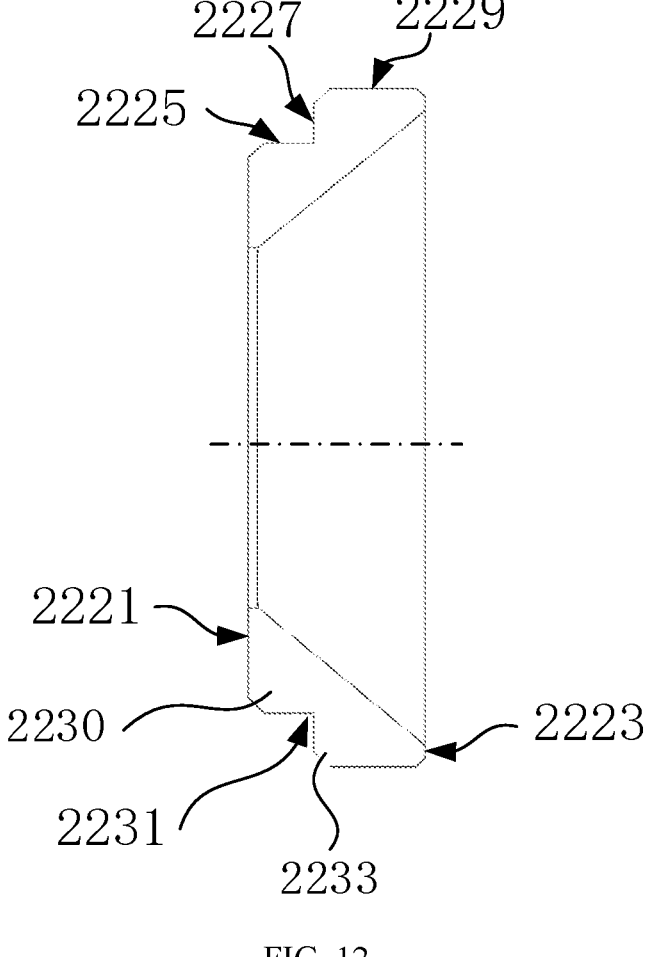
FIG. 12 is a sectional view of a first spacer in a lens module according to an embodiment of the present disclosure.

Referring to both FIG. 11 and FIG. 12, the first spacer 222 may include a first end face 2221 close to the first lens 211, a second end face 2223 close to the second lens 213 and an outer sidewall between the first end face 2221 and the second end face 2223. The outer sidewall may include a first outer wall 2225, a first connection plane 2227 and a second outer wall 2229 sequentially arranged along the axial direction. The first face 2221 and the first outer wall 2225 are perpendicular to form a first outer step 2230, the first outer wall 2225 and the first connection plane 2227 are perpendicular to form a first outer corner 2231, and the first connection plane 2227 and the second outer wall 2229 are perpendicular to form a second outer step 2233. The first outer step 2230 is provided with an avoidance portion for matching the first inner corner 162, and the second outer step 2233 is provided with an avoidance portion for matching the second inner corner 164. An inner sidewall of the first spacer 222 has a cone structure, and an inclination angle of the inner sidewall shall not block light emitted from the first lens 211 to the second lens 213.

Figure 13:
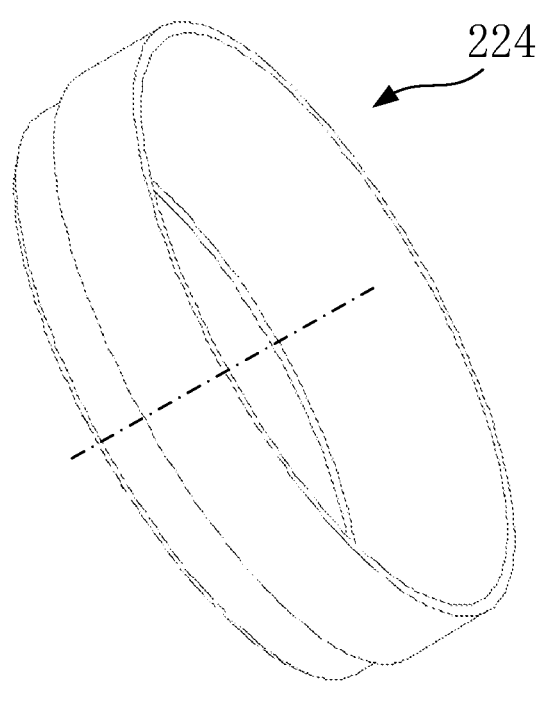
FIG. 13 is a schematic structural diagram of a second spacer in a lens module according to an embodiment of the present disclosure.
Figure 14:
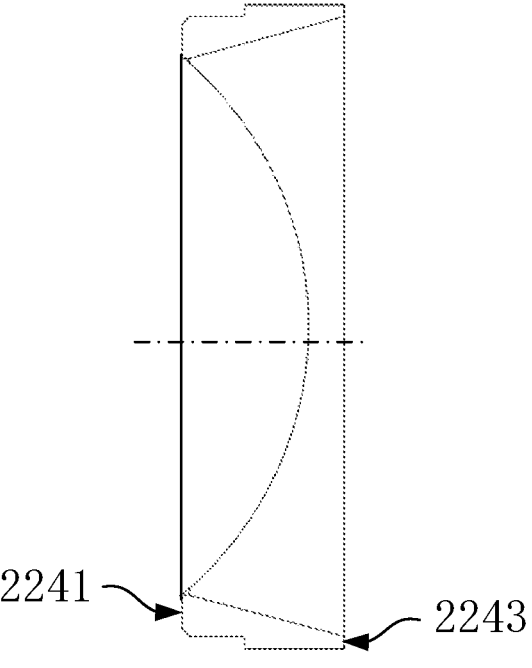
FIG. 14 is a sectional view of a second spacer in a lens module according to an embodiment of the present disclosure.

Referring to both FIG. 13 and FIG. 14, the second spacer 224 may include a third end face 2241 close to the second lens 213, a fourth end face 2243 close to the third lens 215 and an outer sidewall between the third end face 2241 and the fourth end face 2243. An avoidance portion for matching a third inner corner 166 is arranged at a junction between the outer sidewall and the third end face 2241. An inner sidewall of the second spacer 224 also has a cone structure, and an inclination angle of the inner sidewall shall not block light emitted from the second lens 213 to the third lens 215.

Still referring to FIG. 7, during mounting, the first lens 211, the first spacer 222, the second lens 213, the second spacer 224 and the third lens 215 are sequentially mounted in an embedded hole of the lens barrel 120. The first clamping portion 2115 of the first lens 211 is clamped at the first inner step 161 of the lens barrel 120, the first outer step 2230 of the first spacer 222 is clamped to the first inner corner 162 of the lens barrel 120. The first outer corner 2231 is clamped to match the second inner step 163 of the lens barrel 120, and the second outer step 2233 is clamped to the second inner corner 164 of the lens barrel 120. Moreover, an inner diameter of the first end face 2221 of the first spacer 222 is less than the outer diameter of the first lens 211, so that the first end face 2221 may abut against an edge portion of the first lens 211. A light incident side of the second lens 213 abuts against the second end face 2223 of the first spacer 222, and an outer circumferential wall of the second lens 213 matches the third inner wall 145 of the lens barrel 120. An inner diameter of the third end face 2241 of the second spacer 224 is less than the outer diameter of the second lens 213, so that the third end face 2241 may abut against an edge portion of the second lens 213. Moreover, the avoidance portion of the second spacer 224 may match the third inner corner 166. After the pressing plate body 132 is fixed to the lens barrel 120, the buckling member 134 convexly arranged on the inner side of the pressing plate body 132 may just be pressed against the convex lens part of the third lens 215 and may sequentially transfer the pressing force to the second spacer 224, the second lens 213, the first spacer 222 and the first lens 211.

In other words, outer edges of the spacer 220 and the lens 210 in the optical component are clamped to match the inner sidewall of the lens barrel 120 through the stepped structure. Double axial and radial limits may be realized through the pressing action of the buckling member 134, so that the lens 210, the spacer 220 and the lens barrel 120 are fixed in axial and radial directions after mounting.

Figure 15:
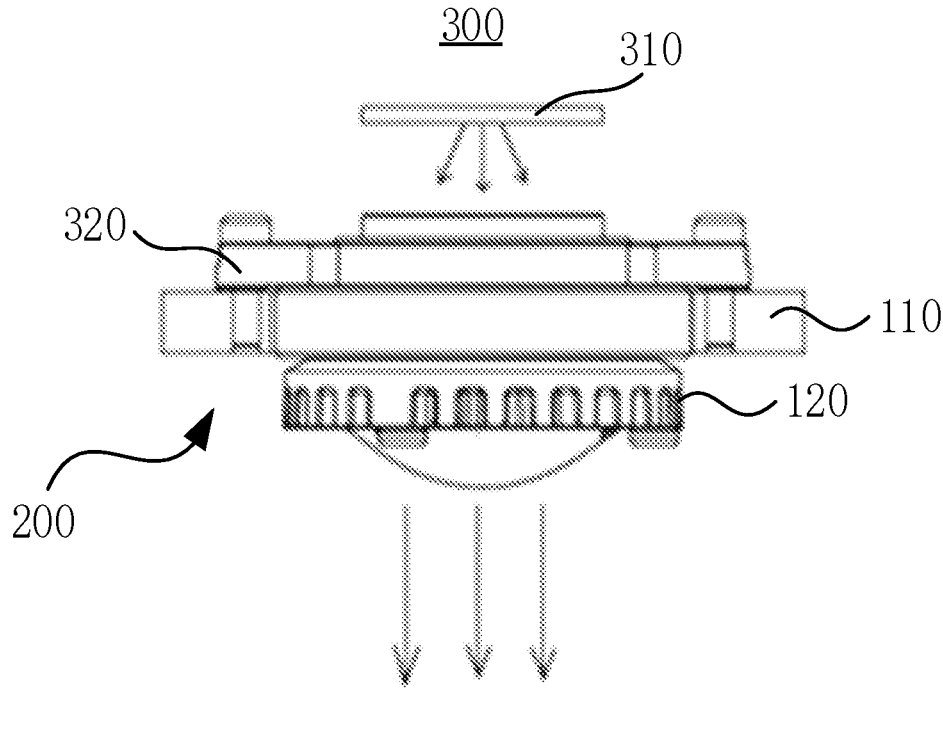
FIG. 15 is a schematic structural diagram of a light source system according to an embodiment of the present disclosure.

Referring to FIG. 15, an embodiment of the present disclosure further provides a light source system 300. The light source system 300 may include a light source 310 and the lens module 200 described above. The light source 310 is located in a front-end light path of the lens module 200.

The light source system 300 may further include a fixing assembly 320. The lens module 200 is mounted to the fixing assembly 320.

The lens holder 110 in the lens housing 100 is fixedly connected to the fixing assembly 320. During mounting, the lens barrel 120 may be screwed to enable the lens housing 100 to drive the optical component to be axially adjusted relative to the light source 310. After axial distance adjustment is completed, they are fixed by applying glue to the position of the glue dispensing slot 122.

In some embodiments, the fixing assembly 320 may include a fixed base and a locking member. The locking member may be a bolt. The fixed base is fixedly connected to the lens holder 110 by the bolt. The fixed base may be provided with a through hole. The lens holder 110 is provided with a threaded hole corresponding to the through hole. During mounting, the bolt passes through the through hole in the fixed base to be in threaded connection with the threaded hole in the lens holder 110.

In order to realize radial movement of the lens module 200 relative to the fixed base to adjust an adjustment range, in some other embodiments, the fixed base is provided with an adjustment hole, and the lens holder 110 is provided with a locking hole. An inner diameter of the adjustment hole is greater than an outer diameter of the locking member. Alternatively, the adjustment hole may be of a structure such as a long round hole or a circular arc hole.

The locking member passes through the adjustment hole to be locked and fixed to the locking hole, so that the lens module 200 has a fixed state and an adjustment state of being movable within the adjustment range of the adjustment hole relative to the fixed base.

When displacement adjustment is required, the locking member is loosened first, and the lens module 200 moves within the adjustment range of the adjustment hole relative to the fixed base. After the lens module 200 is adjusted to a suitable position relative to the fixed base, the lens body is locked to the fixed base through the locking member. Through the axial displacement adjustment, radial position adjustment and rotation adjustment, the adjustment of at least three degrees of freedom may be achieved, which is beneficial to achieve better light combination effect.

It is understood that the number of the light source 310 and the lens module 200 in the light source system 300 is not limited as one, which may also be two or more. When two or more of lens modules 200 are provided, the number of light sources 310 is the same as the number of the lens modules 200 and in one-to-one correspondence. A light combining device may be arranged in a rear-end light path of the lens module 200 to combine light of a plurality of light paths and then emit the light. The axial distance of each lens module 200 is adjusted separately, which helps achieve better light combination effect.

In the light source system 300 according to the present disclosure, the lens barrel 120 is screwed to enable the lens barrel 120, the optical component and the fixed pressing plate 130 to be axially adjusted relative to the light source 310 as a whole, to achieve adjustment on the brightness and the light combination effect.

Based on the above, the lens housing 100, the lens module 200 and the light source module 300 according to the present disclosure may be applied to stage light beam lamps, search-light, search and rescue lamp, etc., or used alone, to achieve axial position correction of a single lens or a lens group. In addition, they may also be applied to light source light paths of light splitting and combination. An optimal light combination effect may be achieved by adjusting the axial distance of each lens barrel 120. Moreover, the lens housing 100 has a simple structure, low costs and good imaging effect, which can better meet market requirements and help improve the market competitiveness of the product.

Finally, it should be noted that the above embodiments are merely intended to describe the technical solutions of the present disclosure instead of limiting the present disclosure. Although the present disclosure is described in detail with reference to the above embodiments, those of ordinary skill in the art should understand that they can still make modifications to the technical solutions described in the above embodiments, or make equivalent replacements to some or all of the technical features in the technical solutions. These modifications or replacements do not make the essence of corresponding technical solutions depart from the scope of the technical solutions of the embodiments of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A lens housing, comprising:
   a lens holder comprising an accommodating cavity having an internal thread;
   a lens barrel provided with a receiving cavity along an axial direction and comprising a plurality of stages of adjustment structures along a circumferential direction, an outer circumferential wall of the lens barrel being provided with an external thread matching the internal thread, and the lens barrel being embedded in the accommodating cavity of the lens holder and in threaded connection with the lens holder; and
   a fixed pressing plate fixed to one side of the lens barrel away from the lens holder and capable of moving axially relative to the lens holder;

wherein the adjustment structures are arranged on at least a part of the outer circumferential wall of the lens barrel, and each stage of the plurality of stages of adjustment structures comprises a plurality of teeth-like grooves or teeth-like protrusions equally spaced from one another, and the stages of adjustment structures are equally spaced from one another along the outer circumferential wall of the lens barrel for a whole circle;

wherein when the lens barrel rotates a teeth-like groove relative to the lens holder, the lens barrel moves by a unit distance axially relative to the lens holder;

wherein the accommodating cavity of the lens holder comprises a first inner sidewall and a second inner sidewall arranged along the axial direction, a stepped structure is formed between the first inner sidewall and the second inner sidewall, an inner diameter of the first inner sidewall is less than an inner diameter of the second inner sidewall, and the internal thread is arranged on the second inner sidewall;

wherein the outer circumferential wall of the lens barrel comprises a first outer sidewall and a second outer sidewall sequentially arranged along the axial direction, an outer diameter of the first outer sidewall is less than an outer diameter of the second outer sidewall, the first outer sidewall matches the first inner sidewall, and the external thread is arranged on the second outer sidewall; and wherein a distance between two adjacent stages of adjustment structures is a first distance, a distance between two adjacent teeth-like grooves or teeth-like protrusions in each stage of adjustment structures is a second distance, and the first distance and the second distance are not equal to each other.

2. The lens housing according to claim 1, wherein the outer circumferential wall of the lens barrel further comprises a third outer sidewall, the outer diameter of the second outer sidewall is less than the third outer sidewall; and the first outer sidewall, the second outer sidewall and the third outer sidewall form the stepped structure, and the adjustment structures are arranged on the third outer sidewall.

3. The lens housing according to claim 2, wherein a glue dispensing slot is provided between an end face of the lens holder close to the second inner sidewall and the third outer sidewall.

4. The lens housing according to claim 1, wherein the fixed pressing plate comprises a pressing plate body fixed to the lens barrel and having an annular structure, and a buckling member protruding from an inner edge of the pressing plate body toward a central position.

5. The lens housing according to claim 4, wherein a plurality of buckling members is provided and is spaced from one another along the inner edge of the pressing plate body, each of the plurality of buckling members comprises a connecting section fixed to the pressing plate body and located in a same plane as the pressing plate body, and a bending section bent toward one side of the pressing plate body close to the lens barrel.

6. A lens module, comprising:
an optical component; and
a lens housing comprising:
    a lens holder comprising an accommodating cavity having an internal thread;
    a lens barrel provided with a receiving cavity along an axial direction and comprising a plurality of stages of adjustment structures along a circumferential direction, an outer circumferential wall of the lens barrel being provided with an external thread matching the internal thread, and the lens barrel being embedded in the accommodating cavity of the lens holder and in threaded connection with the lens holder; and
    a fixed pressing plate fixed to one side of the lens barrel away from the lens holder and capable of moving axially relative to the lens holder, wherein the optical component is embedded into the receiving cavity of the lens barrel, and the fixed pressing plate is pressed against the optical component to lock and fix the optical component in the receiving cavity of the lens barrel;

wherein the adjustment structures are arranged on at least a part of the outer circumferential wall of the lens barrel, and each stage of the plurality of stages of adjustment structures comprises a plurality of teeth-like grooves or teeth-like protrusions equally spaced from one another, and the stages of adjustment structures are equally spaced from one another along the outer circumferential wall of the lens barrel for a whole circle;

wherein when the lens barrel rotates a teeth-like groove relative to the lens holder, the lens barrel moves by a unit distance axially relative to the lens holder;

wherein the accommodating cavity of the lens holder comprises a first inner sidewall and a second inner sidewall arranged along the axial direction, a stepped structure is formed between the first inner sidewall and the second inner sidewall, an inner diameter of the first inner sidewall is less than an inner diameter of the second inner sidewall, and the internal thread is arranged on the second inner sidewall;

wherein the outer circumferential wall of the lens barrel comprises a first outer sidewall and a second outer sidewall sequentially arranged along the axial direction, an outer diameter of the first outer sidewall is less than an outer diameter of the second outer sidewall, the first outer sidewall matches the first inner sidewall, and the external thread is arranged on the second outer sidewall; and wherein a distance between two adjacent stages of adjustment structures is a first distance, a distance between two adjacent teeth-like grooves or teeth-like protrusions in each stage of adjustment structures is a second distance, and the first distance and the second distance are not equal to each other.

7. The lens module according to claim 6, wherein the fixed pressing plate comprises a pressing plate body fixed to the lens barrel and having an annular structure, and a buckling member protruding from an inner edge of the pressing plate body toward a central position, wherein the buckling member compressively fixes the optical component in the receiving cavity of the lens barrel.

8. The lens module according to claim 7, wherein the buckling member comprises a connecting section fixed to the pressing plate body and located in a same plane as the pressing plate body, and a bending section bent toward one side of the pressing plate body close to the lens barrel and pressed against the optical component.

9. The lens module according to claim 6, wherein the optical component comprises a plurality of lenses and spacers, one of the spacers is arranged between any two of the lenses, and the lenses and the spacers are sequentially spaced from one another in the receiving cavity of the lens barrel.

10. A light source system, comprising:
a lens module comprising:
    an optical component; and
    a lens housing comprising:

US 12,631,850 B2

15 a lens holder comprising an accommodating cavity having an internal thread;

a lens barrel provided with a receiving cavity along an axial direction and comprising an adjustment structure along a circumferential direction, an outer circumferential wall of the lens barrel being provided with an external thread matching the internal thread, and the lens barrel being embedded in the accommodating cavity of the lens holder and in threaded connection with the lens holder; and a fixed pressing plate fixed to one side of the lens barrel away from the lens holder and capable of moving axially relative to the lens holder, wherein the optical component is embedded into the receiving cavity of the lens barrel, and the fixed pressing plate is pressed against the optical component to lock and fix the optical component in the receiving cavity of the lens barrel; and a light source located in a front-end light path of the lens module;

wherein the adjustment structure is arranged on at least a part of the outer circumferential wall of the lens barrel, and the adjustment structure comprises a plurality of teeth-like grooves or teeth-like protrusions spaced from one another;

wherein when the lens barrel rotates a teeth-like groove relative to the lens holder, the lens barrel moves by a unit distance axially relative to the lens holder;

wherein the accommodating cavity of the lens holder comprises a first inner sidewall and a second inner sidewall arranged along the axial direction, a stepped structure is formed between the first inner sidewall and the second inner sidewall, and the internal thread is arranged on the second inner sidewall; and wherein the outer circumferential wall of the lens barrel comprises a first outer sidewall and a second outer sidewall sequentially arranged along the axial direction, an outer diameter of the first outer sidewall is less than an outer diameter of the second outer sidewall, the first outer sidewall matches the first inner sidewall, and the external thread is arranged on the second outer sidewall.

\* \* \* \* \*